Figure 1:
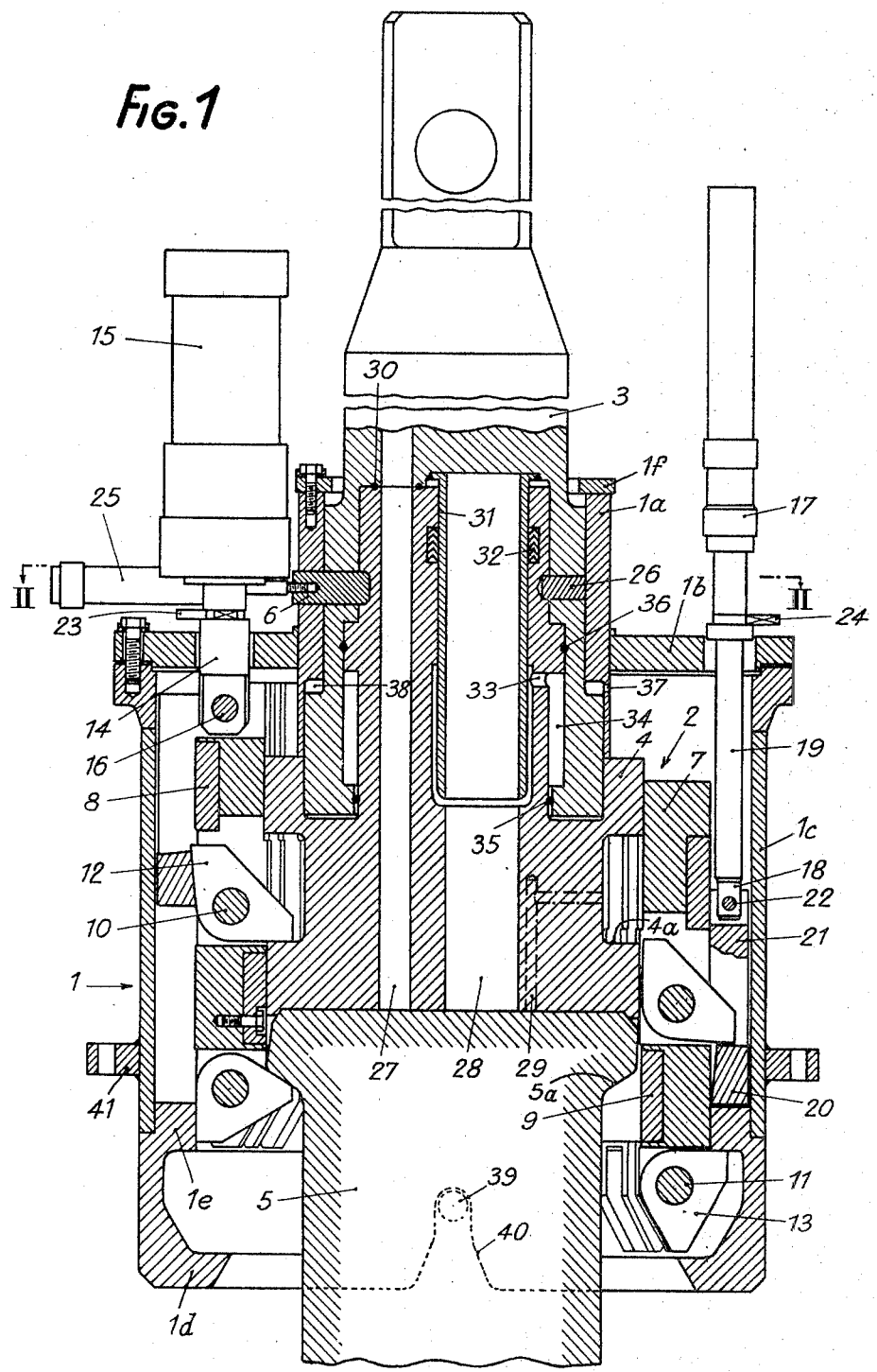

United States Patent [19]
Capot

[11] 3,841,665
[45] Oct. 15, 1974

[54] SYSTEM FOR CONNECTION OF TWO IMMERSED CONDUITS

[75] Inventor: Lucien Capot, Eysines, France

[73] Assignee: Subsea Equipment Associates Limited (SEAL), Hamilton, Bermuda

[22] Filed: May 4, 1973

[21] Appl. No.: 357,138

[30] Foreign Application Priority Data
June 9, 1972  France .............................. 72.20868

[52] U.S. Cl. ...................... 285/2, 285/27, 285/310, 285/315, 285/320, 285/DIG. 21
[51] Int. Cl. ............................................. F16l 35/00
[58] Field of Search ............ 166/0.6; 285/2, 24, 27, 285/309, 310, 364, 315, 406, 320, 420, DIG. 21

[56] References Cited
UNITED STATES PATENTS

| | | | |
|---|---|---|---|
| 1,195,360 | 8/1916 | Kelley ......................... | 285/DIG. 21 |
| 3,325,190 | 6/1967 | Eckert et al. ................... | 285/320 X |
| 3,492,027 | 1/1970 | Herring ........................... | 285/315 X |
| 3,502,353 | 3/1970 | Burns .................................... | 285/2 |
| 3,701,549 | 10/1972 | Koomey ............................... | 285/24 |

Primary Examiner—Dave W. Arola
Attorney, Agent, or Firm—Sughrue, Rothwell, Mion, Zinn & Macpeak

[57] ABSTRACT

A connector for joining the end of a riser 3 to the upper end of an immersed conduit 5 from an underwater drilling well. This connector may be rapidly disconnected when any abnormal tractive force is exerted by the column 3.

The connection is effected by the action of jacks 15 which pivot cams 13 against flange surface 5a of the conduit, and by the subsequent action of jacks 17 which pivot cams 12 against barrel surface 4a and lock them with the wedge rings 20. Jacks 25 release the riser 3 from the barrel 4 of the connector.

12 Claims, 2 Drawing Figures

SYSTEM FOR CONNECTION OF TWO IMMERSED CONDUITS

The invention relates to a connector suitable for disconnectably joining the lower extremity of a rising column, known in the petroleum industry by the name of "riser," to the upper extremity of an underwater well drilling head, and in a general manner to any vertical conduit.

Systems of automatic connection between two conduits with the same axis are already known, but these systems generally necessitate a rigorous alignment of the axes or at least an excellent presentation of one conduit relative to the other: conditions which are difficult to realise at great depths.

According to one aspect of the present invention there is provided a disconnectable connector for joining a first conduit, such as an immersed well head, to a second conduit, such as a rising column of tubes or riser, said connector comprising a skirt for connection to the second conduit and equipped with a locking coupling including lower and upper cams, each movable around an axis, the coupling being associated with first jacks adapted to bring the lower cams against a support surface of the first conduit, there being a ring situated on the path of the upper cams and associated with second jacks, the second jack drives adapted to rock the upper cams on support surfaces of the lower part of the second conduit, the pressing together of the connection surfaces of the first and second conduits and also the locking of the position of the upper cams.

This connector permits the axis of the lower part of a column to be progressively put into parallelism with the vertical axis of an immersed conduit, since the driving of the couplings by the jacks brings the parts of the conduit and of the column which are spaced furthest apart to approach each other during the control of the jacks bringing the upper cams to bear on the support surfaces of the column.

In one embodiment of the invention there is provided a connector of this type capable of taking up both slight lateral separations between the axes of the immersed conduit and of the column and also their angular deflections relative to the horizontal, the lower part of the skirt being equipped with a conical border which flares out downwards and the lower cams being disposed all around the lower internal part of the skirt in such a way that they present their lateral surfaces in alignment with the said conical border, external lugs carried by the conduits to be connected guiding the orientation of the skirt by the sliding of the rims of mortices which widen out downwards and which belong to the lower part of the skirt.

The connector of the invention permits the rapid disconnection in case of abnormal force exerted by the column. To this end, the lower part of the column preferably comprises a barrel which is rendered integral with the column by shear pins, the bearing surfaces of the upper cams being disposed on the barrel.

When an abnormal traction is exerted on the well head by the rising column, the pins shear, thus suppressing any damaging action on the well head.

The connector of the invention also permits the recovery thereof in case of rupture of the shear pins. For this purpose, the skirt preferably is provided with an upper flange which overhangs a shoulder of the lower part of the column, means being provided between the flange and the shoulder to control the automatic liberation of the control circuits of the jacks.

Because of this, any abnormal traction not only results in the uncoupling of the barrel from the column but also in the disconnection of the control circuits of the jacks. It follows that when the shoulder of the column comes into contact with the upper flange of the skirt, the latter is driven, bringing with it the locking coupling of which the jacks, no longer exerting any effect, free the cams.

The connector of the invention can be adapted to ensure complete security of the system of connection during the positioning manoeuvres and the attempts to interlock the skirt, the barrel and the column by holding pins actuated by the jack. Thus, before utilization of the system, control tractions can be exerted without damage on the riser, without rupture of the shear pins. The pins can be relieved of the shearing effects due to the high pressures exerted on the column, by the presence of a compensation chamber comprised between the barrel and the column, the pressure existing in the chamber tending to apply vertical opposed forces to the barrel and to the column. It is possible in this way to obtain practically the shearing of the pins solely by actions exerted directly on the column by mechanical forces other than those due to the well pressure.

To slow down the placing of the barrel in communication with the external medium during the rupture of the shear pins, there may be added a tubular sheath fixed at its upper part to the column and entering the passage of the barrel, thereby extending the tubing conduit, and by providing control means for closing the safety valves between the upper shoulder of the column and the upper flange of the skirt.

Thus during shearing the control means for these safety valves are immediately actuated, while the tubular sheath, sliding on the interior of the barrel, continues to ensure the passage of products flowing from the tubing until the valves are closed.

Other features will be understood from the following description, which refers to the annexed drawings which represent, as a non-limiting example, a preferred embodiment of the invention.

Figure 2:
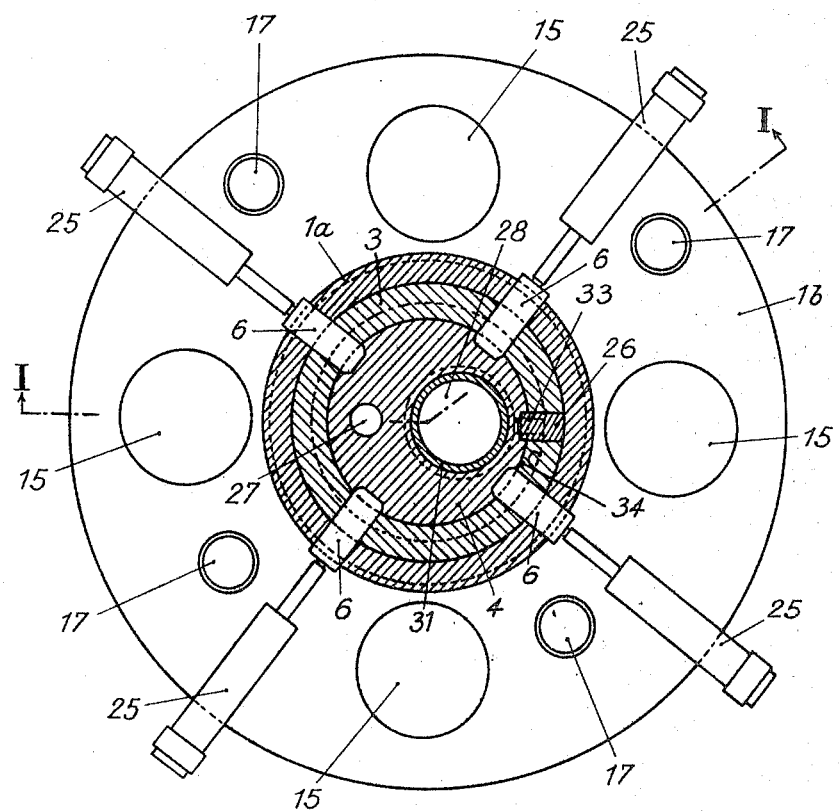

In the drawings:

FIG. 1 represents a diagrammatic view in axial section showing the locking coupling in locked and nonlocked position, and FIG. 2 is a sectional view through the section II—II indicated on FIG. 1.

The connector is essentially composed of an external skirt 1 composed of integral pieces 1a to 1f, a locking coupling 2 comprising the carrying assembly having rider 7 and upper ring 8 and lower ring 9, an intermediary piece 3 integral with the lower extremity of the riser, and a barrel fitting on the other extremity of the conduit to be connected 5.

The external skirt 1 possesses a series of openings in its upper cylindrical part 1a serving to guide the holding pins such as 6 passing through the intermediate piece 3 and entering a blind hole of the barrel 4.

The skirt 1, the intermediate piece 3 and the barrel 4 are thus secured together.

The locking coupling 2 comprises a series of riders such as 7 joined together by means of upper ring 8 and lower ring 9. Each rider carries two shafts such as 10 and 11 on which pivot respectively cams 12 and 13.

Each rider 7 is connected to the extremity 14 of the rod of a closing jack 15 by means of a shaft 16. These jacks are rendered integral with the horizontal part 1b of the skirt 1 by conventional means of attachment. These means do not play any special role and can be of any nature, and are not shown for the sake of greater clarity of the drawing.

On part 1b there is provided, in addition to the jacks 15, locking jacks such as 17 of which the extremity 18 of the rod 19 is attached to a ring 20 by means of carrying pieces such as 21, the latter being connected to the extremities 18 of the rods of the jacks by means of shafts 22.

The oil circuits controlling the jacks 15 and 17 have been symbolised respectively by the rectangles 23 and 24. These feed conduits are of any conventional type with releasable engagement in order to suppress, on the one hand, any abnormal control of the jacks in case of necessity for whatever cause, and on the other hand to permit the separation of the conduits from the jacks. The control of the release can be effected by any conventional known device and actuated preferably by the coming together of the column 3 and the flange 1f of the skirt 1.

The holding pins 6 are also controlled by jacks such as 25. The attachment of these jacks to the skirt 1 can be of any nature, and has not been shown in order to make the drawing clearer.

The intermediate piece 3 is also connected to the barrel 4 by shear pins such as 26 lodged in the intermediate piece 3 and entering a blind hole in the barrel.

Although the inner part of the barrel 4 can be of any type, the barrel comprises, according to a preferred embodiment of the invention, an annulus conduit 27, a tubing conduit 28 and at least one hydraulic control conduit 29 for any manipulation of any type of conventional organ such as safety valves.

A toroidal joint 30 ensures sealing between the intermediate piece 3 and the upper part of the barrel surrounding the annulus conduit 27.

A tubular sheath 31 or stinger is affixed by its upper part to the intermediate piece 3, extending the upper part of the tubing conduits 28. A joint with chevrons 32 laterally ensures the sealing of the conduits 28 at the level of the sheath. A channel 33 communicates the tubing conduit 28 with an annular compensation chamber 34 formed by the space between the facing surfaces of the intermediate piece 3 and of the barrel 4 provided between the toroidal joints 35 and 36.

A channel 37 traverses the lower part of the vertical cylinder 1a of the skirt and communicates the annular chamber 38 situated between the skirt and the intermediate piece with the exterior.

Lugs 39 carried by the conduit 5 cooperate with mortices 40 of the lower part 1d of the skirt.

The invention relates to the connector which has been described rather than to means permitting the bringing up of the lower extremity of the column or riser serving to connect an underwater well head to a surface unit; it is supposed that the lower part 1d of the skirt of the connector has been brought into a position directly above the upper part of the flange 5a of the conduit 5. It will be observed that because of the conical form given to the lower internal extremity of the part 1d of the skirt and the shape and the positions of the cams 13, a certain lateral deviation can exist between the axes of the connector system and of the conduit 5, the conical shape of the lower part of the skirt permitting this lateral deviation to be taken up during the descent of the skirt 1.

In addition, the shape of the mortices 40 permits progressive pivoting of the skirt 1 around its axis until the bottom of the mortice 40 comes to rest on the lug 39; this permits the taking up, during the descent of the skirt, of a certain angular deviation between the orientations of the column and of the immersed conduit to be connected.

As for the inclination between the axes of the conduits to be connected 5 and of the skirt 1, it will be seen from the above description of the functioning of the system how this deviation is taken up.

The skirt 1 of the connector, fixed to the intermediate piece 3 of the lower extremity of the column as has been described above, comes to rest like a cap, after its descent, on the upper part of the conduit 5 to be connected, as the right hand part of FIG. 1 shows.

During the descent, the skirt 1 remains connected to the assembly of the intermediate piece 3 and the barrel 4 by the holding pins 6. When the skirt 1 has surrounded the upper part of the conduit 5, as shown in the right hand part of FIG. 1, the skirt 1 can be disconnected from the intermediate piece 3 and the barrel 4 by the actuation of jacks such as 25. After these jacks have pulled back their rods into their cylinders, causing the retraction of the holding pins 6, the skirt rests freely on the barrel 4 while the barrel 4 and the intermediate piece 3 remains connected by the shear pins 26.

The operation of the closing jack 15 causes the locking coupling 7 to rise again from the position represented on the right hand side of FIG. 1 to the position represented on the left hand side. During its displacement, cam 13 rocks about its axis 11, bearing on the boss 1e of the internal part of the skirt 1. In its final position, cam 13 bears partly on the boss 1e, and partly against the lower part of the flange of conduit 5 serving as a support surface.

In order to lock the connecting system, the locking jacks 17 are actuated to pull back their rods 19 into their respective cylinder, driving the pieces 21 supporting the ring 20. In rising up, the ring 20 causes the rocking of the cams 12 which rest partly on the upper surface of the flange 4a of the barrel 4 and partly on the internal face of the ring 20. The latter is laterally guided by the internal face of the cylindrical part 1c of the skirt 1. Locking is obtained by a wedge effect, the internal faces of the parts of the ring 20 cooperating with the cams 12 being given an inclination relative to the vertical less than the angle of friction.

After the jacks 17 have thus locked the cams 12, the deviation of inclination of the axis of the barrel relative to the axis of the conduit 5 is taken up and the lower extremity of the barrel 4 fits perfectly against the upper part of the conduit 5. For greater clarity, the elastomeric or metallic joints ensuring the sealing of the conduit 5 and the barrel 4 have not been shown.

The pressure in the control circuits of the jacks 15 and 17 can then be decreased, the cams 12 remaining locked by the ring 20.

If for any reason the traction of the column on the conduit 5 exceeds a desired value, which traction could result from a non-vertical force, the shear pins 26 break, thus freeing the intermediate piece 3 from the barrel 4. It will be observed that the force causing the rupture of the pins 26 results from an external force exerted directly on the riser and not from the force, which can be very large, resulting from a very high pressure in the interior of the conduit 5. In order to suppress partially the effect of such an overload, a compensation chamber 34 fed by a channel 33 in communication with the internal part of the tubing conduits 28 has been provided. Communication is effected, in the example given, below the sheath 31. Thus, a part of the pressure arising from the well is used to separate the upper and lower faces of the chamber 34 belonging respectively to the barrel 4 and to the intermediate piece 3. In this way, the shear pins 26 are relieved, since they are no longer subjected to the only traction exerted upwards and arising from the well pressure, but to this diminished force, of the desired value and only depending for a given pressure on the section of the chamber.

When the pins 26 break under the effect of the excessive traction exerted on the intermediate piece 3 by the column, the latter lifts and abuts against the flange 1f bordering the upper part 1a of the skirt. This action immediately results, by a guillotine effect due to the approach of the piece 3 and the internal border of the flange 1f, in the actuation of the safety devices and notably the setting in action of these safety valves and also the automatic release of the hydraulic control circuits represented diagrammatically by 23 and 24. These various devices for actuation of the controls do not come within the scope of the invention and can be constituted by known devices, and have not been described.

The drive of the sheath 31 by the intermediate piece permits the continuity of the tubing conduit 28 to be ensured during the time necessary for the closing of these safety valves, so that the separation of the intermediate piece 3 from the valve 4 can occur without appreciable loss of petroleum products.

It will also be observed that the shock of the intermediate piece 3 against the upper flange of the skirt is damped by the presence of the small annular chamber 38 which only opens into the sea by a small channel 37.

The absence of pressure on the jacks 15 and 17 in conjunction with the traction exerted by the piece 3 on the skirt progressively causes the part 1d of the skirt to rise up again and also the rocking of the cams which, at the end of the movement, take up again the positions indicated on the right hand side of the drawing, the skirt being this time lifted above the conduit 5.

Although a preferred embodiment of the invention has been described in the preceeding text, it goes without saying that numerous variations can be made in the details of the structure of the parts shown. For example the compensation chamber can be unnecessary in certain cases. The same is true of the sheath 31 and in consequence the joint 32. As for the shear pins and the holding pins, they could have the same axis, the shear pin being a dowel, and the holding pin partially lodging within it.

It is obvious that the skirt can comprise any annexed means of attachment such, for example, as the fastening 41 for the connection of the skirt to any desired element, a guide tool for example, and that the connection surfaces comprise any appropriate joints, metallic joints for eample.

What we claim is:

1. A coupling connector for joining a first conduit, such as an immersed undersea well head, to a second conduit, such as a riser, comprising:
   a. a generally cylindrical skirt assembly surrounding and connected to the second conduit and adapted to be lowered over the first conduit,
   b. a locking coupling mounted within the skirt assembly, and comprising:
      1. upper and lower locking cam segments
      2. first and second jack cylinder means mounted to the skirt assembly and having reciprocable actuating arms,
      3. a first ring member coupled to the actuating arms of the first jack cylinder means,
      4. means mounting the upper and lower cam segments to the first ring member for rotation about generally horizontal axes, and
      5. a second ring member coupled to the actuating arms of the second jack cylinder means and positioned to rotate the upper cam segments upon movement through actuation of the second jack cylinder means,
   c. a camming surface on the skirt assembly positioned to rotate the lower cam segments upon movement of the first ring member through actuation of the first jack cylinder means,
   d. a support surface on the first conduit positioned to be engaged by the lower cam segments upon rotation thereof, and
   e. a support surface on the second conduit positioned to be engaged by the upper cam segments upon rotation thereof,
   f. the upper and lower cam segments urging their respective support surfaces in opposite, converging directions upon rotation to thereby press the first and second conduits together.

2. A connector according to claim 1, wherein the skirt assembly is connected to the second conduit by retractable pins extending through aligned holes in the skirt assembly and second conduit, the pins being movable by third jack cylinder means coupled thereto.

3. A connector according to claim 1, in which the second conduit has a lower part comprising a barrel which carries the said support surface of the second conduit and which is joined to the second conduit by shear pins.

4. A connector according to claim 1 wherein the lower part of the skirt assembly has a generally conical inlet facilitating the introduction of the skirt assembly onto the first conduit.

5. A connector according to claim 4, wherein the lower extremity of the skirt assembly includes mortices adapted to engage guide lugs on the exterior of the first conduit.

6. A connector according to claim 3, wherein an external surface of the second ring member slides on an internal wall of the skirt assembly, an internal surface of the second ring member being inclined to the vertical such that when the second jack cylinder means are actuated and the upper cam segments rest on the support surface of the barrel, the internal surface of the second ring member rests on a lateral surface of the upper cam segments of the same inclination relative to the vertical.

7. A connector according to claim 1, wherein a lower part of the second conduit comprises a barrel carrying the support surface of the second conduit, the barrel comprising a first passage for an annular conduit and a second passage for a tubing conduit, the barrel being fitted at its upper part in a sealing manner to the lower surface of the second conduit by the superposition of joints surrounding each of the orifices of the passage, the lower part of the second conduit being provided, between the barrel and the skirt assembly, with retractable holding pins connecting together the skirt assembly, the second conduit and the barrel.

8. A connector according to claim 7, wherein shear pins extend through aligned holes in the barrel and the second conduit.

9. A connector according to claim 1, wherein the lower part of the second conduit is provided with a barrel which carries the support surface of the second conduit, the barrel being connected laterally to the second conduit by shear pins, the skirt assembly comprising a flange and its upper end and the second conduit having a shoulder such that, when the upper and lower cam segments effect the connection between the first and second conduits, the flange is above the shoulder, means for freeing actuating conduits of the jack cylinder means being provided between the flange and the shoulder such that, in case of overload, the breaking of the shear pins results in the freeing of the second conduit relative to the barrel, the bringing together of the shoulder with the flange of the skirt assembly, and the actuation of the means for freeing the actuating conduits of the jack cylinder means.

10. A connector according to claim 9, wherein the lower end of the second conduit is connected to a tubular sheath entering a passage of the barrel, an annular joint lodged in the barrel sealing the sheath in the barrel.

11. A connector according to claim 10, wherein a part of the external surface of the barrel forms with a part of the internal surface of the lower part of the second conduit an annular sealed chamber bordered above and below by joints between the barrel and the second conduit, a channel formed in the barrel communicating the chamber with the passage.

12. A connector according to claim 9, wherein the upper part of the skirt assembly comprises an internal skirt which, in use, rests at the bottom on a shoulder of the barrel and forms with a part of the external surface of the lower part of the second conduit an annular chamber, an opening in the internal skirt communicating the chamber with the exterior.

* * * * *